United States Patent
Ho et al.

(10) Patent No.: US 7,209,919 B2
(45) Date of Patent: Apr. 24, 2007

(54) LIBRARY SERVER LOCKS DB2 RESOURCES IN SHORT TIME FOR CM IMPLICIT TRANSACTION

(75) Inventors: Mang-Rong Ho, San Jose, CA (US); Tawei Hu, San Jose, CA (US); Lily Liang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 10/459,330

(22) Filed: Jun. 11, 2003

(65) Prior Publication Data

US 2004/0254933 A1    Dec. 16, 2004

(51) Int. Cl.
 *G06F 17/30* (2006.01)
(52) U.S. Cl. .................. 707/8; 707/3; 707/4; 709/201; 709/229
(58) Field of Classification Search ............ 707/3–4, 707/8; 709/201, 229
See application file for complete search history.

(56) References Cited

U.S. PATENT DOCUMENTS

| | | | |
|---|---|---|---|
| 4,587,609 A | 5/1986 | Boudreau | |
| 4,819,159 A | 4/1989 | Shipley | |
| 5,161,227 A | 11/1992 | Dias | |
| 5,285,528 A | 2/1994 | Hart | |
| 5,742,830 A | 4/1998 | Elko | |
| 5,940,828 A | 8/1999 | Anaya | |
| 6,275,823 B1 | 8/2001 | Ronstroem | |
| 2002/0161815 A1* | 10/2002 | Bischof et al. | 709/101 |
| 2002/0174200 A1* | 11/2002 | Kozina | 709/220 |
| 2003/0070000 A1* | 4/2003 | Coker et al. | 709/318 |
| 2003/0149671 A1* | 8/2003 | Yamamoto et al. | 705/59 |

OTHER PUBLICATIONS

Ancilotti et al., "A Distributed Commit Protocol for a Multicomputer System", IEEE Transactions on Computers, vol. 39, Issue 5 (May 1990), pp. 718-724.*

* cited by examiner

*Primary Examiner*—Khanh Pham
(74) *Attorney, Agent, or Firm*—Fay, Sharpe, Fagan, Minnich & McKee, LLP

(57) ABSTRACT

A method, system and article of manufacture for reducing a deadlock probability during transaction processing in a computer network system having a plurality of users of the network system that comprises a content management system performing implicit transactions via API calls to a library server on a plurality of entities shareable by users of the network. The computer-implemented method comprises invoking a transaction sequence in response to a transaction request, performing a prepare portion of the transaction sequence, implicitly committing the prepare portion of the transaction, performing an update portion of the transaction sequence, and fully committing the transaction.

15 Claims, 4 Drawing Sheets

LIBRARY SERVER LOCKS DB2 RESOURCES IN SHORT TIME FOR CM IMPLICIT TRANSACTION

BACKGROUND OF THE INVENTION

The invention pertains to the problem of potential database deadlocks or timeouts due to the locking of resources during transactions, on a content management (CM) system in particular. Databases store data in a variety of manners depending on the internal organization. For example, a relational database system, typically stores data in tables. The tables are comprised of rows, each of which contains a record. The record, in turn, contains entities and the entities contain the actual related data values for a data "object." Each table may also be associated with one or more indexes, which provide rapid access to the rows in an order determined by the index and based on key data values contained in selected entities in each row. As an example, a row might be associated with each employee of an organization and contain entities that hold such information as the employee name, an identification number, and telephone numbers. One index might order the rows numerically by employee identification number, while another index might order the rows alphabetically by employee name.

Such a database conventionally includes methods which insert and delete rows and update the information in a row. When changes are made to the rows, any database indexes associated with the table may also need to be updated in order to keep the indexes synchronized with the tables. The rows in each table are mapped to a plurality of physical pages on the disk to simplify data manipulation. Such an arrangement is illustrated in FIG. 1.

In FIG. 1, table 10, which illustratively consists of rows 12, 14, 16, and 18, is mapped to a chain of pages of which pages 20, 22, and 24 are shown. In the table illustrated, each row consists of five separate entities. For example, row 12 consists of entities 26, 28, 30, 32 and 34. The entities in each of rows 12, 14, 16 and 18 are mapped illustratively to page 22 which can contain data for more than one row. For example, entity 26 maps to location 36 in page 22. Entity 28 maps to location 38. Entity 30 maps to location 40. In a similar manner entity 32 maps to location 42 and entity 34 maps to location 44. The entities in the next row 14 are mapped directly after the entities in row 12. For example, entity 46 is illustrated and maps to page location 48. When the page is completely filled with data, entity information is mapped to the next page in the page chain. The pages are chained together by means of page pointers. For example, page pointer 50 links pages 20 and 22, whereas page pointer 52 links pages 22 and 24. All of the pages used to store the data in table 10 are linked together in a similar manner in a page chain.

The data pages are normally kept in a page buffer pool located in system memory. In order to make such a database system persistent or "durable", the data pages must be written to an underlying non-volatile storage system, such as a disk storage. This storage operation takes place on a page level so that when a modification is made to data on a page the entire page is stored in the persistent storage. Each page could be copied to the persistent storage as soon as data on the page was modified. However, this immediate copying greatly slows the system operation since persistent storage is generally much slower than RAM memory. Alternatively, the information in modified pages in the buffer pool can be copied or "flushed" to the disk storage at intervals. For example, the information could be flushed periodically or when the number of changed pages in the buffer pool reaches some predetermined threshold. During this disk flushing operation, the data modifications are performed "in place" so that the old data is either overwritten or deleted from the disk and lost.

Since the data is lost during the modification process, in order to ensure data integrity in the case of a system failure, or crash, the actions performed on the database are grouped into a series of "transactions". Each transaction is "atomic" which means that either all actions in the transaction are performed or none are performed. The atomic property of a transaction ensures that the transaction can be aborted or "rolled back" so that all of the actions which constitute the transaction can be undone. Database transactions commonly have a "commit" point at which time it can be guaranteed that all actions which comprise the transaction will complete properly. If the transaction does not reach the commit point, then it will be rolled back so that the system can return to its state prior to the initiation of the transaction. Consequently, if there is a system termination or crash prior to the commit point, the entire transaction can be rolled back.

The use of a buffer pool complicates transaction processing because even though a transaction has committed, system operation could terminate after a page has been modified, but before the modified page is flushed to disk. In order to prevent data loss caused by such a system interruption, a logging system is used to permit data recovery. The logging system records redo and undo information for each data modification in a special file called a "recovery log" that is kept in non-volatile storage.

During the processing of a CM transaction, it is to be appreciated that locks are placed on database pages and resources so that a second concurrent CM transaction does not replace entities, unknown to the first CM transaction, before the first CM transaction has modified selected entities and performed a write operation for those modifications. Additionally, many systems maintain add the restriction that all write locks created by a CM transaction should be held until the transaction commits.

A problem that arises with CM transaction schedulers is that transactions can get involved in deadlocks or can time-out waiting for a resource to be released from a lock. CM transactions sometimes have to wait for locks where such waiting is caused by another transaction holding a conflicting lock, and the waiting transaction cannot make any progress until the other transaction releases its lock. If two CM transactions are waiting for each other, neither can make progress until the other one releases its lock. As long as neither of them releases its lock, the two transactions are deadlocked. More generally, deadlocks can involve more than two CM transactions that are waiting for each other in a cyclic way.

Therefore, it is desirable to provide a method and apparatus which can reduce the potential for deadlocks and time-outs caused by resource locking, particularly in a high volume CM system.

The present invention therefore provides a solution to the aforementioned problems, and offers other advantages over the prior art.

BRIEF SUMMARY OF THE INVENTION

In accordance with the present invention, there is provided a method of reducing a deadlock probability during transaction processing of a user-requested transaction in a computer network system having a plurality of users of the network system. The computer network system comprises a content management system performing implicit transactions via API calls to a library server on a plurality of entities shareable by users of the network. The method comprises invoking a transaction sequence in response to a transaction request, performing a prepare portion of the transaction sequence, implicitly committing the prepare portion of the transaction, performing an update portion of the transaction sequence, and fully committing the transaction.

In accordance with another aspect of the present invention, there is provided a computer network system having a plurality of users of the network system, the system comprising a content management system, configured to process transaction requests from the users and running on the computer network system, a means for invoking a transaction sequence in response to a transaction request, a means for performing a prepare portion of the transaction sequence, a means for implicitly committing the prepare portion of the transaction, a means for performing an update portion of the transaction sequence, and a means for fully committing the transaction.

In accordance with yet another aspect of the present invention, there is provided an article of computer-readable media having contents that cause a content management system running on a computer network system to perform the computer-implemented steps of invoking a transaction sequence in response to a transaction request bu a user, performing a prepare portion of the transaction sequence, implicitly committing the prepare portion of the transaction, performing an update portion of the transaction sequence, and fully committing the transaction.

One benefit obtained from the present invention is the reduction in time that system resources are in a locked state.

Another benefit obtained from the present invention is the reduction in the possibility of a deadlock between separate transactions, each waiting for a locked resource the other transaction holds.

Yet another benefit obtained from the present invention is the reduction in the possibility of a time-out occurring when a transaction is waiting for a locked resource.

Other benefits and advantages of the subject method and system will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings hereof and wherein.

DETAILED DESCRIPTION OF THE INVENTION

Figure 1:
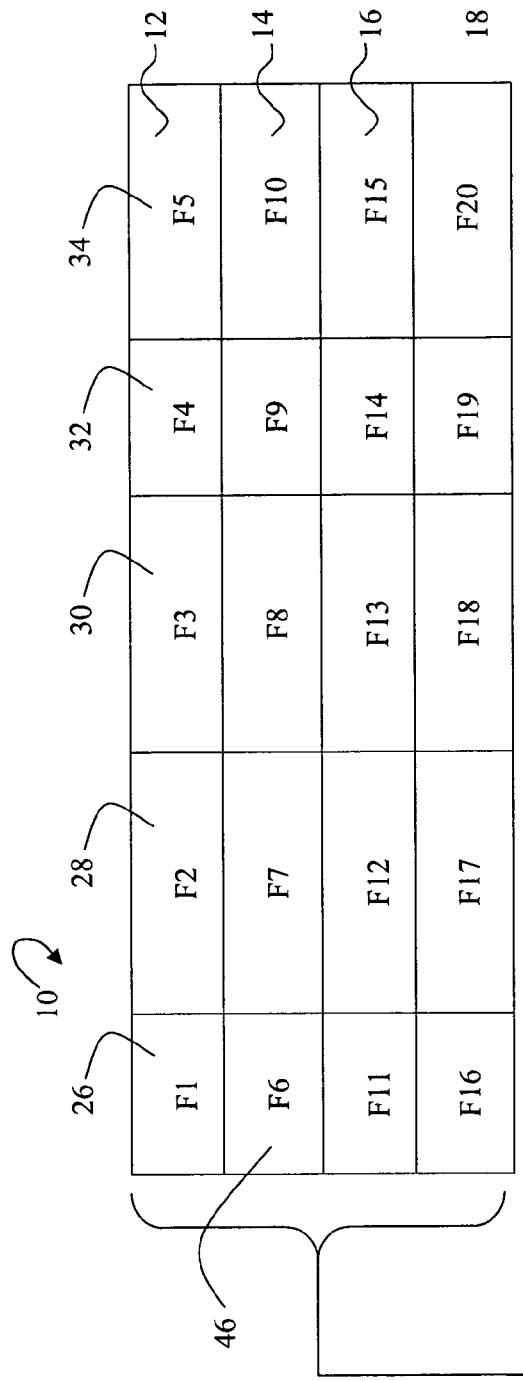
FIG. 1 is an abstracted block diagram illustrating rows in a database table mapped to a plurality of physical pages on a disk.
Figure 1:
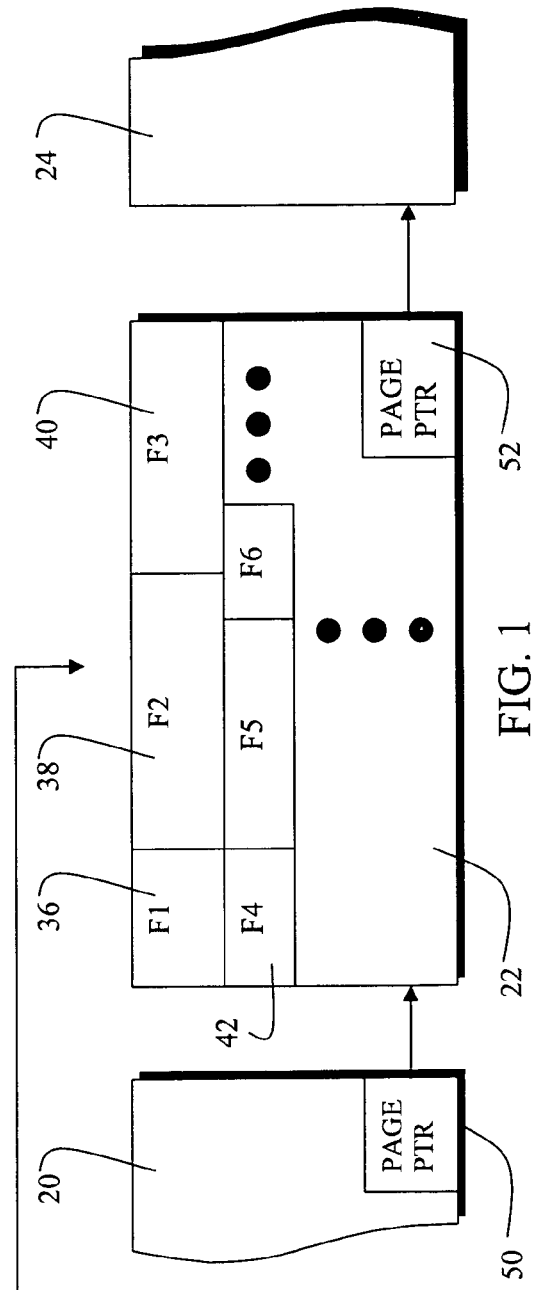

Reference will now be made in detail to the preferred embodiment of the present invention, examples of which are illustrated in the accompanying drawings, wherein like reference numerals refer to like elements throughout.

The detailed description which follows is presented in terms of general procedures, steps and symbolic representations of operations of data bits within a computer memory, associated computer processors, networks, and network devices. These procedure descriptions and representations are the means used by those skilled in the data processing art to convey the substance of their work to others skilled in the art. A procedure is here, and generally, conceived to be a self-consistent sequence of steps or actions leading to a desired result. Thus, the term "procedure" is generally used to refer to a series of operations performed by a processor, be it a central processing unit of a computer, or a processing unit of a network device, and as such, encompasses such terms of art as "objects," "functions," "subroutines" and "programs."

The procedures presented herein are not inherently related to any particular computer or other apparatus. In particular, various general purpose machines may be used with programs in accordance with the teachings herein, or it may prove more convenient to construct more specialized apparatus to perform the required method steps.

However, one of ordinary skill in the art will recognize that there exists a variety of platforms and languages for creating software for performing the procedures outlined herein. One of ordinary skill in the art also recognizes that the choice of the exact platform and language is often dictated by the specifics of the actual system constructed, such that what may work for one type of general purpose computer may not be efficient on another type of general purpose computer.

One of ordinary skill in the art to which this invention belongs will have a solid understanding of content management systems, database management systems, and methods of securely controlling access to entities managed by the content management system such as an access control list (ACL) in particular. It being recognized that such practitioners do not require specific details of the software, but rather find data structure descriptions and process descriptions more desirable (due to the variety of suitable hardware and software platforms), such specifics are not discussed to avoid obscuring the invention.

Figure 2:
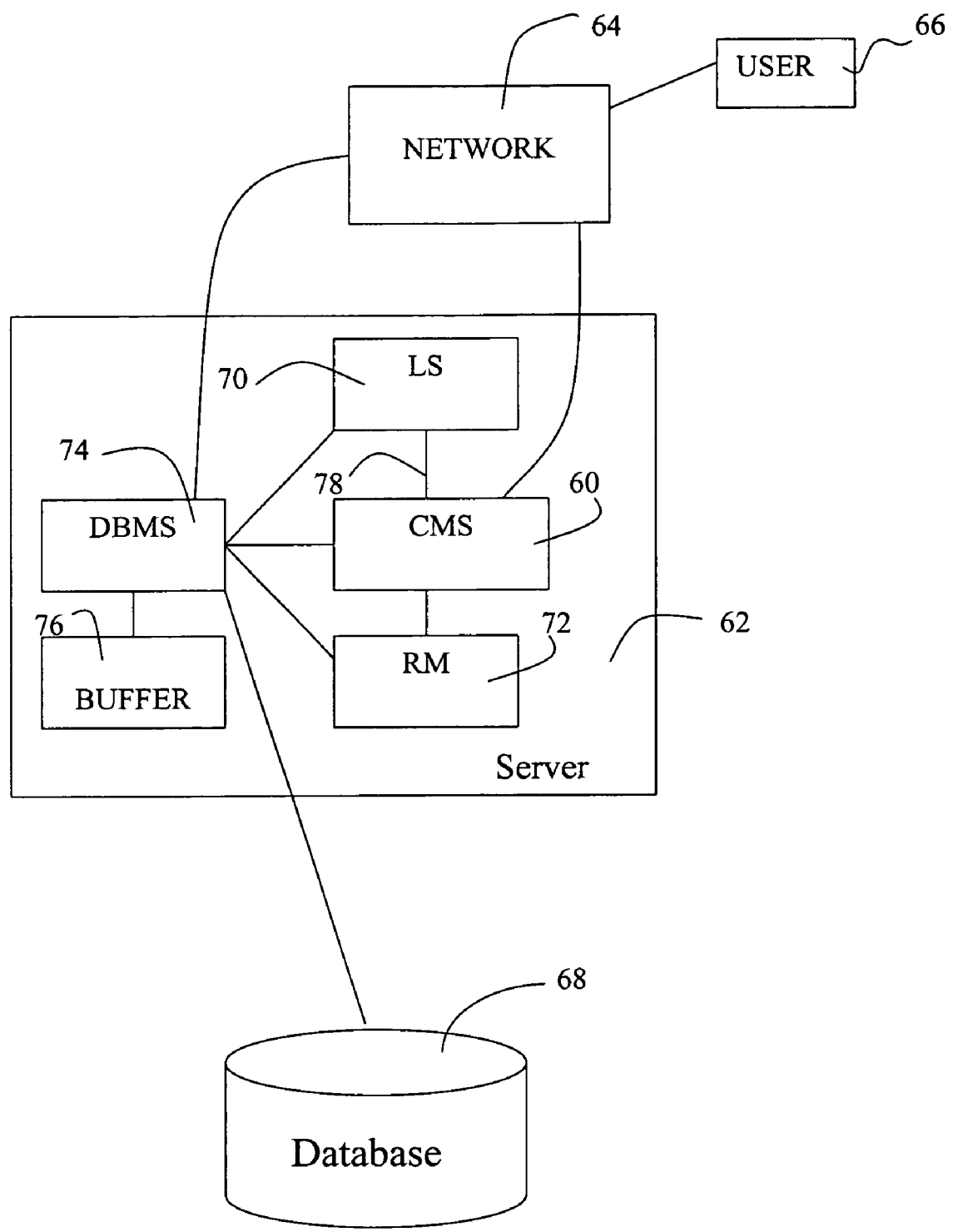
FIG. 2 is a block diagram of a network-connected content management system in accordance with a preferred embodiment of the present invention.

FIG. 2 is a block diagram of a network connected content management system in accordance with a preferred embodiment of the present invention. The system shown in FIG. 2 is particularly suited to delivery of content over a network or the Internet. A content management system 60 is running on a server computer 62 which is connected to a network 64. One or more users 66 of the CMS 60 access controlled entities on a content database 68, such as a DB2 database for instance, by communicating with the CMS 60 via the network 64. The CMS 60 is in communication with a library server (LS) 70, a resource manager (RM) 72 and a database management system (DBMS) 74. The DBMS 74 utilizes a page cache buffer 76 residing in server 62 random access memory (RAM) for buffering database pages retrieved from and being written to the database 68. The CMS 60, LS 70, RM 72 and the DBMS 74 are shown in the figure as running on the same server 62, however, it is to be appreciated that some or all of these may be running on separate, network-connected, computers.

On the system illustrated, a CM transaction is defined as a work unit for a single user, although the CM system 60 can be concurrently processing multiple transactions for multiple users 66. In a preferred embodiment, a CM transaction consists of a sequence of application program interface (API) calls made through a single connection 78 to the LS 70. If any API call fails in the intermediate portion of a transaction, all of the database entities are rolled back to their respective original states at the beginning of the transaction.

There are two categories of CM transactions, namely explicit transactions and implicit transactions. Explicit transactions are controlled by the user 66 who starts and ends the explicit transaction, either committing or rolling back the transaction as a final step. An implicit transaction is one where the invoking user wishes to perform a single-item creation, update or deletion on the database 68, and desires to have the transaction automatically committed upon completion, without the necessity of explicitly committing the transaction via a separate API call.

Figure 3:
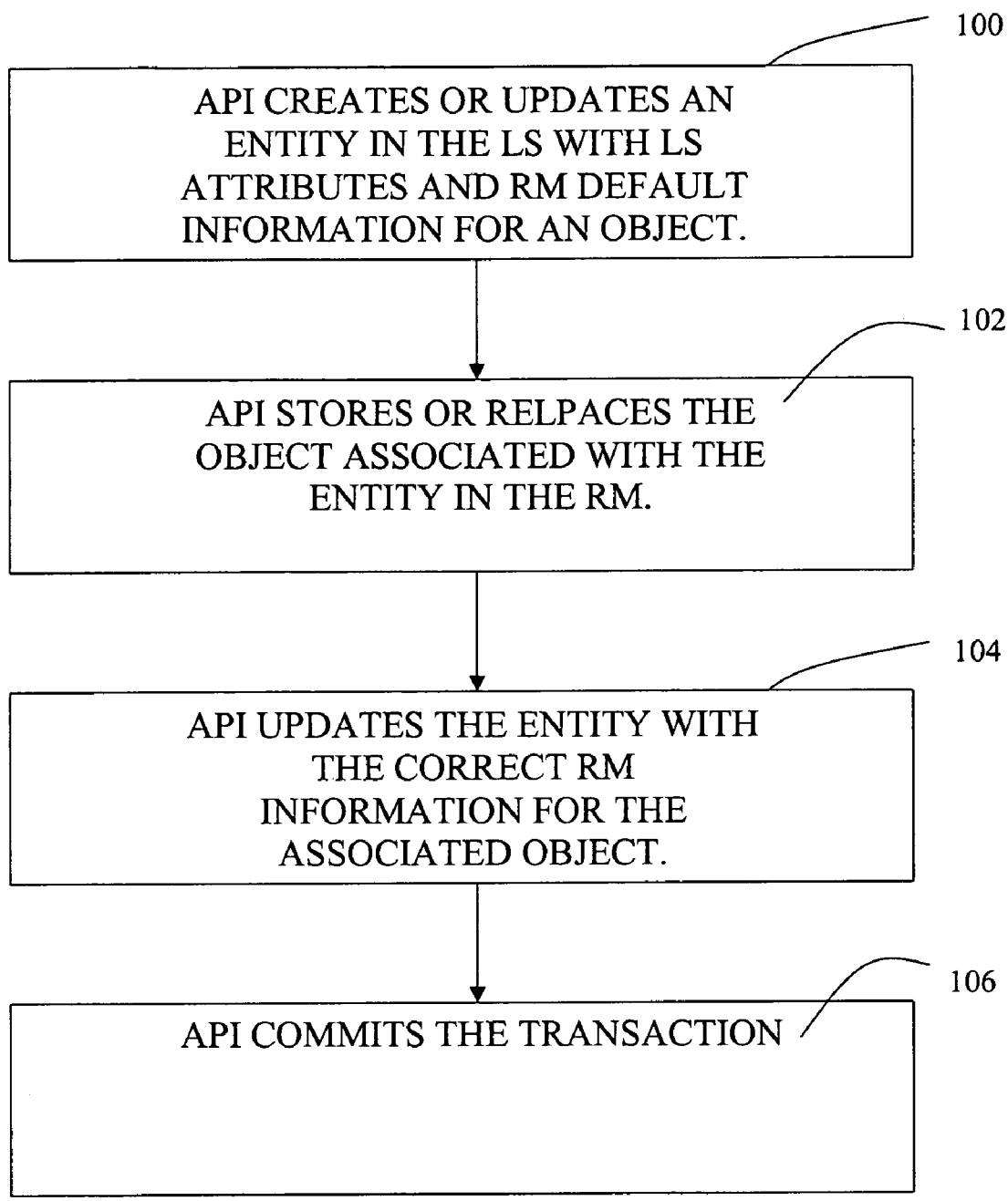
FIG. 3 is a flowchart of a prior art API sequence that does not commit an implicit transaction until entities in both a library server and a resource manager are updated to the database.

In an exemplary prior art CM system, the API does not commit the implicit transaction until entities in both the LS 70 and the RM 72 are updated to the database 68. A corresponding sequence of processing steps is shown in FIG. 3. At processing step 100, the API creates or updates, depending on the transaction type, an entity in the LS 70 with LS attributes and RM default information for an associated object. At step 102, the API stores or replaces the object associated with the entity in the RM 72. At step 104, the API updates the entity with the correct RM information for the associated object. Finally, at step 106, the API commits the transaction.

The above-described API sequence, however, introduces the undesirable possibility of deadlocks or time-outs as previously described. Thus, in the preferred embodiment, a new API sequence is provided to reduce the probability of deadlocks or time-outs. The new sequence also resolves a situation where a user retrieves an entity which has either default or correct object information with an uncommitted read (UR) from the LS 70 and the object cannot be found in the RM 72. Because, at a prepare step, there is yet no entry in the user table, and another transaction cannot find both the entity on the LS side and the object on the RM side. An item is not physically created or updated until the associated object has been stored or replaced in the RM 72.

Figure 4:
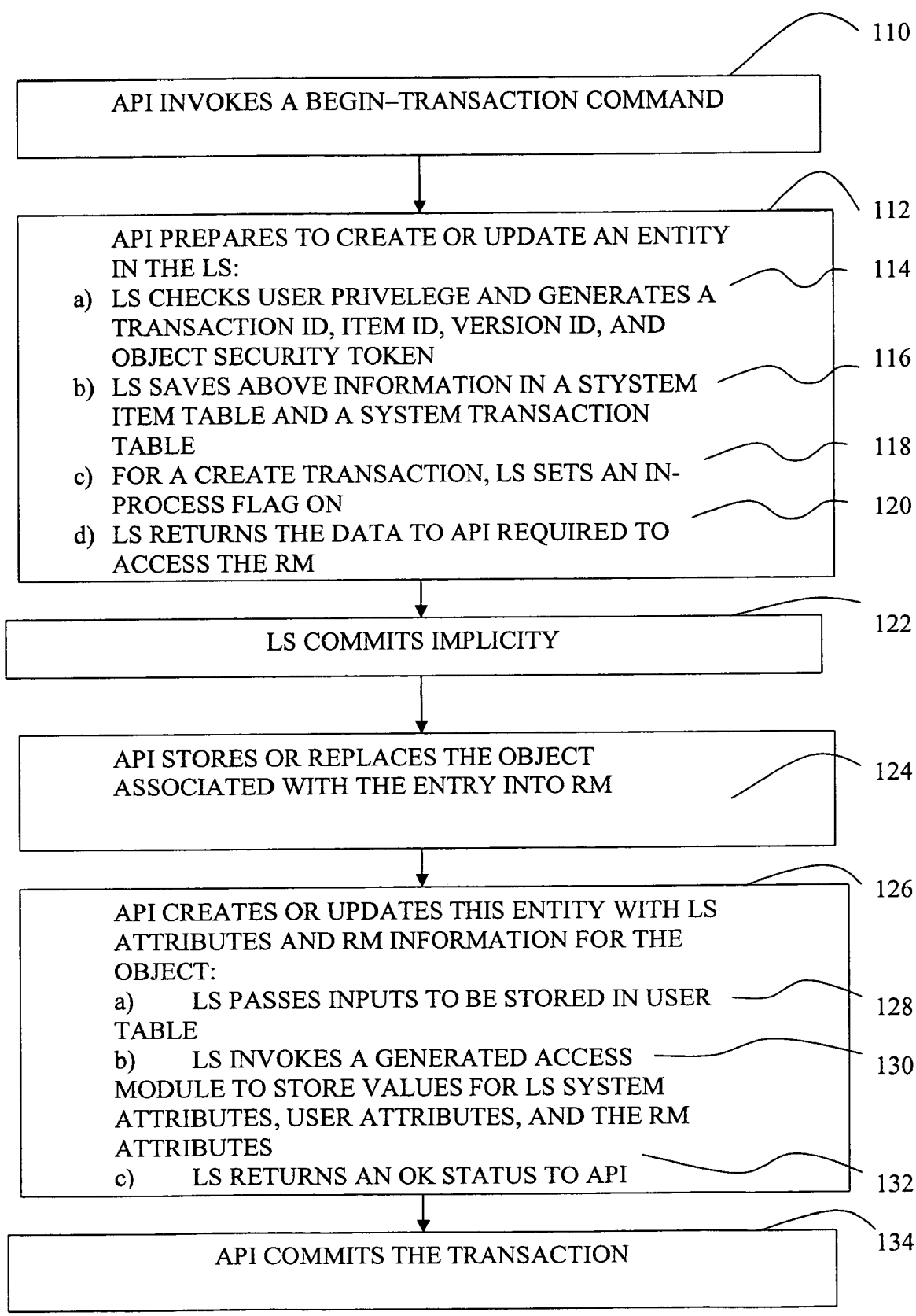
FIG. 4 is a flowchart for an API sequence according to a preferred embodiment of the present invention.

With reference now to FIG. 4, a new API sequence of the preferred embodiment is provided. At processing step 110, the API invokes a begin-transaction command to prepare the system for processing a new transaction. The functions performed by this step in the API sequence is dependent on the particular computer, and the particular operating system (OS) on which the CM system is running. There begin-transaction functions are well known in the art. The API then prepares to create or update an entity in the LS 70 by performing the prepare step 112 comprising: step 114 where the LS 70 checks the respective user privileges and generates a transaction ID, item ID, version ID and an object security token, step 116 where the LS 70 saves the information from the prior step in a system item table (not shown) and a system transaction table (not shown), step 118 where the LS 70 sets an in-progress flag on if the transaction is a create transaction, and step 120, where the LS 70 returns the data required to access the RM 72 to the API. The above-described steps are each well known in the art and describe typical steps necessary for the processing of a user-requested transaction.

Subsequent to the above-described prepare step 112, in various embodiments of the present invention, the LS 70 commits the transaction implicitly at step 122, thus freeing locked resources, reducing the possibility of deadlock or time-out for other concurrent transactions. The implicit commit is performed in a transparent manner with respect to the user. The user is aware that the results of the transaction will be committed (hardened) at the successful completion of the transaction, however, the intermediate implicit commit of the present invention is not made known to the user, and the user is unaffected by it, except for performance improvements. At step 124, the API stores or replaces the object associated with the entity in the RM 72. Following this, at step 126 the API creates or updates the entity with LS attributes and RM information for the associated object wherein: the LS 70 parses user inputs to be stored in a user table (not shown) at step 128, the LS invokes a generated access module to store values for LS system attributes, user attributes and RM attributes associated with the transaction at step 130, and the LS 70 returns an OK status to the API at step 132.

The API finally commits the entire transaction at step 134 after receiving the OK status from the LS at step 132 thus removing any remaining deadlock or time-out possibilities.

The invention has been described with reference to the preferred embodiments. Potential modifications and alterations will occur to others upon a reading and understanding of the specification. It is our intention to include all such modifications and alterations insofar as they come within the scope of the appended claims, or the equivalents thereof.

Having thus described our invention, we now claim:

1. In a computer network system having a plurality of users of the network system and including a content management system performing transactions via calls through an API to a library server on a plurality of entities shareable by said users of the network system, a method of reducing a deadlock and timeout probability during processing of transactions, the method comprising:

invoking a transaction sequence in response to receiving a request from one of said plurality of users for a transaction, wherein the transaction sequence includes performing at least two commits per transaction;

performing a prepare portion of the transaction sequence including: checking user privileges corresponding to a requesting user, generating transaction information, and storing the transaction information in a system transaction table;

implicitly committing the prepare portion of the transaction sequence as a first commit which is implicit and which stores transaction information in a system information table, thereby freeing locked resources and enabling access to previously locked objects;

performing an update portion of the transaction sequence; and fully committing said transaction as a second commit which is explicit and which removes any remaining deadlock or time-out possibilities.

2. The method as set forth in claim 1 wherein:

the invoking is in response to receiving one or more of a create entity request for creating an entity and an update entity request for updating an entity from said plurality of users; and, the performing a prepare portion includes generating transaction information including a transaction ID and an item ID;

saving transaction information in a system item table and a transaction table; and selectively setting an in-progress flag if creating an entity.

3. The method as set forth in claim 2, wherein the performing the prepare portion is performed by said library server and further includes:

returning data necessary to access a resource manager (RM).

4. The method as set forth in claim 3, wherein the performing an update portion includes:
  storing or replacing an object associated with the entity into said resource manager; and,
  creating or updating the entity with library server attributes and resource manager information for said object.

5. The method as set forth in claim 4, wherein the creating or updating the entity includes:
  using the library server, parsing inputs received from said one of said plurality of users for storage in a user table;
  using the library server, invoking a generated access module for storing library server attributes, user attributes and resource management attributes; and,
  returning a status code from the library server to said API.

6. A computer network system having a plurality of users of the network system comprising:
  a content management system running on said computer network system, configured to process transaction requests from said users through an API to a library server;
  means for invoking a transaction sequence in response to receiving a request from one of said plurality of users for a transaction, wherein the transaction sequence includes performing at least two commits per transaction;
  means for performing a prepare portion of the transaction sequence including: checking user privileges corresponding to a requesting user, generating transaction information, and storing the transaction information in a system transaction table;
  means for implicitly committing the prepare portion of the transaction sequence as a first commit which is implicit and which stores transaction information in a system information table, thereby freeing locked resources and enabling access to previously locked objects;
  means for performing an update portion of the transaction sequence; and,
  means for fully committing said transaction as a second commit which is explicit and which removes any remaining deadlock or time-out possibilities.

7. The computer network system as set forth in claim 6 wherein:
  the means for invoking is in response to receiving one of a create entity request for creating an entity and an update entity request for updating an entity from said plurality of users; and,
  the means for performing a prepare portion includes:
    means for generating transaction information including a transaction ID and an item ID;
    means for saving transaction information in a system item table and a transaction table; and,
    means for selectively setting an in-progress flag if creating an entity.

8. The computer network system as set forth in claim 7, wherein the means for performing the prepare portion further includes:
  means for performing said prepare portion in said library server; and,
  means for returning data necessary to access a resource manager (RM).

9. The computer network system as set forth in claim 8, the means for performing an update portion includes:
  means for storing or replacing an object associated with the entity into said resource manager; and,
  means for creating or updating the entity with library server attributes and resource manager information for said object.

10. The computer network system as set forth in claim 9, the means for creating or updating the entity includes:
  means for parsing inputs received from said one of said plurality of users for storage in a user table;
  means for invoking, using said library server, a generated access module for storing library server attributes, user attributes and resource manager attributes; and,
  means for returning a status code from said library server to said API.

11. An article of computer-readable media having contents that cause a computer network having a plurality of users of the network, and including a content management system running on said computer network system, processing transaction requests from said users via calls through an API to a library server, by performing the computer-implemented steps of:
  invoking a transaction sequence in response to receiving a transaction request from one of said plurality of users for a transaction, wherein the transaction sequence includes performing at least two commits per transaction;
  performing a prepare portion of the transaction sequence including: checking user privileges corresponding to a requesting user, generating transaction information, and storing the transaction information in a system transaction table;
  implicitly committing the prepare portion of the transaction sequence as a first commit which is implicit and which stores transaction information in a system information table, thereby freeing locked resources and enabling access to previously locked objects;
  performing an update portion of the transaction sequence; and,
  fully committing said transaction as a second commit which is explicit and which removes any remaining deadlock or time-out possibilities.

12. The article of computer-readable media as set forth in claim 11, wherein:
  the invoking is in response to receiving one or more of a create entity request for creating an entity and an update entity request for updating an entity from said plurality of users; and,
  the performing a prepare portion includes:
    generating transaction information including a transaction ID and an item ID;
    saving transaction information in a system item table and a transaction table; and
    selectively selling an in-progress flag if creating an entity.

13. The article of computer-readable media as set forth in claim 12, wherein the performing the prepare portion is performed by said library server and further includes:
  returning data necessary to access a resource manager.

14. The article of computer-readable media as set forth in claim 13, wherein the performing an update portion includes:
  storing or replacing an object associated with the entity into said resource manager; and,
  creating or updating the entity with library server attributes and resource manager information for said object.

15. The article of computer-readable media as set forth in claim 14, wherein the creating or updating the entity includes:
  parsing inputs received from said one of said plurality of users for storage in a user table;
  using the library server, invoking a generated access module for storing library server attributes, user attributes and resource manager attributes;
  returning a status code from the library server to said API.

* * * * *